Figure 4:
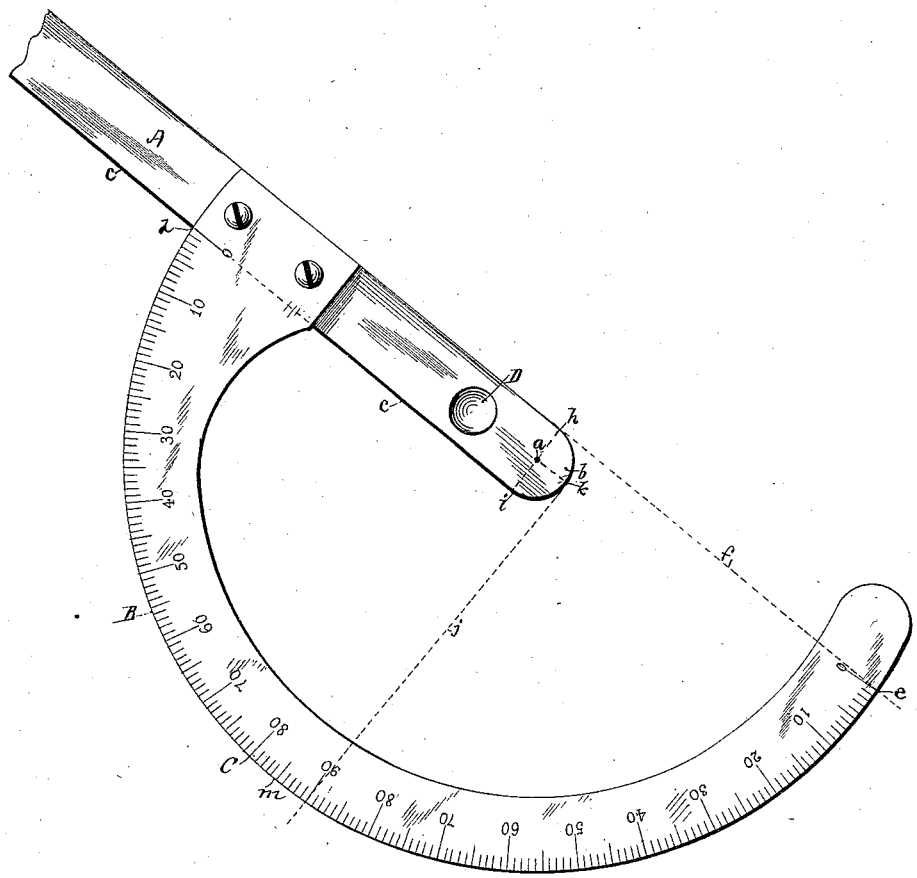

(No Model.) 2 Sheets—Sheet 1.
S. DARLING.
PROTRACTOR.
No. 376,430. Patented Jan. 17, 1888.
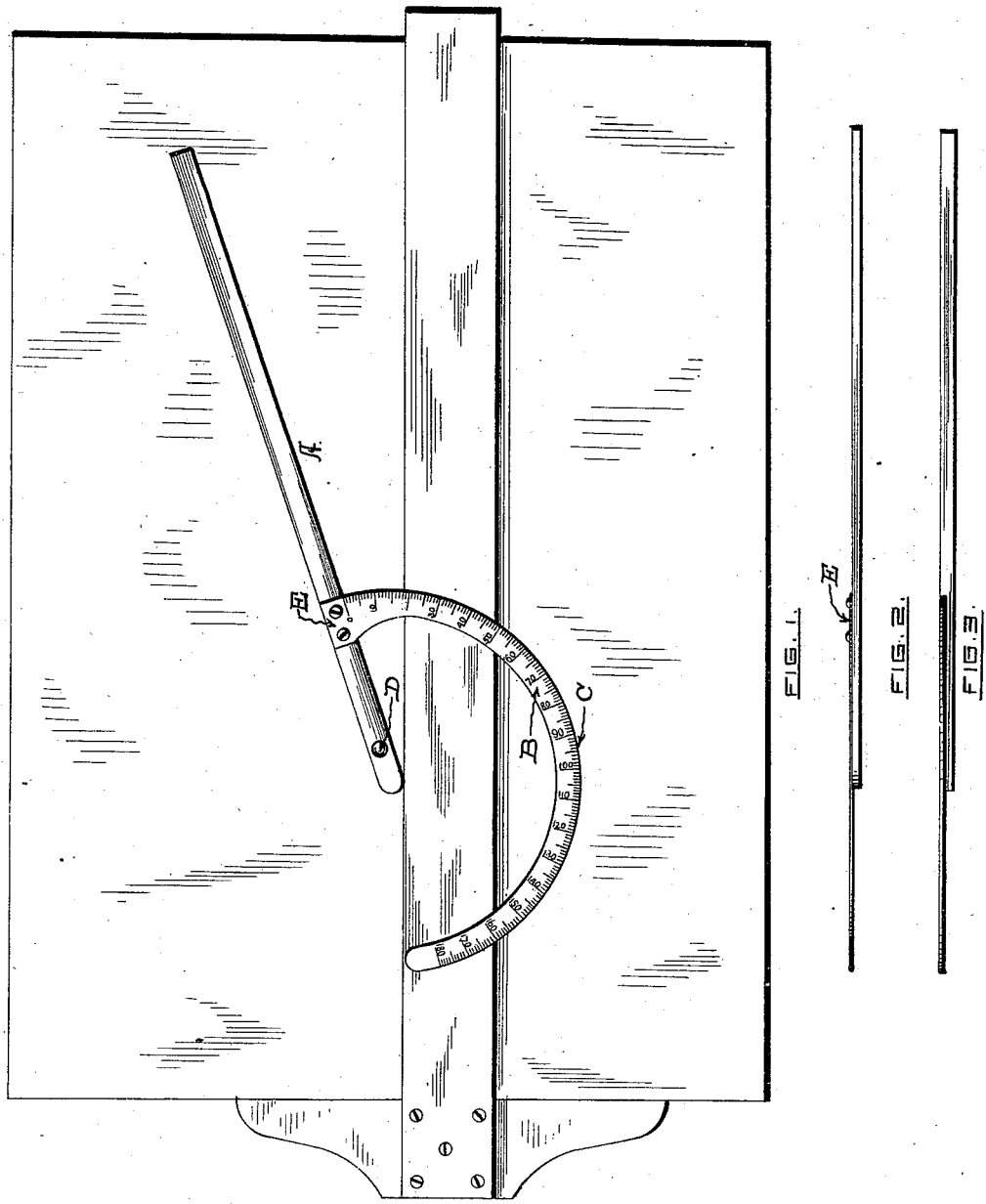
WITNESSES:
A. J. Shaw
D. C. Woodward
INVENTOR:
Sam¹ Darling (No Model.) 2 Sheets—Sheet 2.

S. DARLING.
PROTRACTOR.

No. 376,430. Patented Jan. 17, 1888.

Witnesses
Chas. F. Schmelz
Socrates Scholfield

Inventor
Saml Darling.

N. PETERS, Photo-Lithographer, Washington, D. C.

UNITED STATES PATENT OFFICE.

SAMUEL DARLING, OF PROVIDENCE, RHODE ISLAND.

PROTRACTOR.

SPECIFICATION forming part of Letters Patent No. 376,430, dated January 17, 1888.

Application filed April 22, 1887. Serial No. 235,743. (No model.)

*To all whom it may concern:*

Be it known that I, SAMUEL DARLING, a citizen of the United States, residing at Providence, in the State of Rhode Island, have invented a new and useful Improvement in Protractors, of which the following is a specification.

The principal features of this improved protractor are simplicity, accuracy, and cheapness; and it consists of a blade and graduated arc or circle, the edge of one end of the blade being made circular and concentric with the center of the arc, the graduation-points of the arc or circle at its periphery being located in certain imaginary tangents to the corresponding degrees in the periphery of the circular end of the blade, as hereinafter fully set forth.

Figure 1 is a top view of the protractor and a square with which it is to be used. Fig. 2 is an edge view of the protractor, showing the arc attached to the plane surface of the blade by means of screws. Fig. 3 is an edge view of the protractor with a thicker blade, and having the arc gained into the blade, thus making one surface of the blade and arc in the same plane. Fig. 4 is a top view, with a portion of the blade broken away, showing the location of the graduation-points of the arc in imaginary tangents drawn from the periphery of the circular end of the blade.

In the accompanying drawings, A represents the blade of the protractor; B, the graduated arc; C, the graduations; D, a depression in the blade near its circular end for the finger to rest in to hold the protractor in position when in use.

The circular end of the blade, which is made concentric with the arc, is to be used either against the edge of a square or straight-edge, or on a line when the former are not at hand, and when used with a square or straight-edge the blade A should be nearly the thickness of the square or straight-edge below the under surface of the arc, in order that the arc may lie upon and over the tongue of the square or straight-edge, and the under surface of the arc should come very near to the upper surface of the said square or straight-edge, for the reason that the working-edge of the said square or straight-edge serves to indicate the degrees on the arc for laying off the proper angle at the edge of the blade of the protractor.

The arc B may be attached to the surface of the blade A by means of rivets or screws, as shown at E in Figs. 1 and 2; or it may be gained into the blade, as shown in Fig. 3, and riveted or screwed to the blade with countersunk heads to make one surface of the blade and arc in the same plane, in which construction the arc may be graduated upon both sides, in order that the arc side of the protractor can be laid on the paper, and the circular end of the blade be used on a line instead of being used against a straight-edge; but when the graduated arc is let into the blade, as shown in Fig. 3, the blade should be made the thickness of the arc thicker than it is when the arc is attached upon the surface of the blade, as shown in Fig. 2, in order to properly provide for the thickness of the working-edge of the square or straight-edge with which the protractor is to be used.

The system upon which the arc B is graduated is illustrated in Fig. 4, the point $a$ being the common center of the circular end $b$ of the blade A and the graduated arc B, the graduation lines C being preferably made to radiate from the common center $a$, and to cut the periphery $m$ of the arc at a point which lies in an imaginary tangent-line drawn from the corresponding degree of the periphery of the circular end of the blade. Thus the edge $c$ of the blade A, which passes through the zero-point $d$ at one end of the arc, is a true tangent to the periphery of the circular end $b$, and the zero-point $e$ at the opposite end of the arc lies in the imaginary tangent $f$, drawn in line with the opposite edge of the blade, the said tangent being drawn from the point $h$, which is diametrically opposite to the point $i$, which bounds the circular end $b$ of the blade, and when the graduations of the arc are so commenced and limited every intermediate degree of the periphery of the arc will lie in a point which is in an imaginary tangent-line drawn from the corresponding degree in the periphery of the circular end of the blade, as is shown by the imaginary line $j$, which is a tangent to the point $k$ corresponding to ninety degrees of the periphery of the circular end $b$ of the blade, and cuts the point of ninety degrees in the periphery $m$ of the arc, and this tangential relation of the graduation-points of the arc with the said concentric circular end of the blade is necessary to the general correctness of the protractor for use.

It is obvious that the protractor can be made in one piece, with the blade and arc of the same thickness, or that the blade and arc can be made in separate pieces of the same thickness and halved together, making both sides of the blade and arc in the same plane with each other, to be used on a line, and also that there may be a graduated circle instead of a part of a circle without departing from the principle of my invention.

I claim as my invention—

1. A protractor having a blade provided with a circular end, and a circumscribing arc or circle arranged concentric with the circular end of the blade and having a graduation into degrees at the periphery of the arc or circle, which points of graduation lie in the imaginary tangent-lines which may be drawn from the corresponding degrees at the periphery of the circular end of the blade, substantially as described.

2. A protractor having a blade provided with a circular end, and a circumscribing arc or circle arranged concentric with the circular end of the blade and having a graduation into degrees at the periphery of the arc or circle, which points of graduation lie in the imaginary tangent-lines which may be drawn from the corresponding degrees at the periphery of the circular end of the blade, and having the opposite edges of the blade parallel to each other, and tangents to the periphery of the circular end of the said blade, substantially as described.

3. A protractor having a blade provided with a circular end, and a circumscribing arc or circle arranged concentric with the circular end of the blade and having a graduation into degrees with its zero-point in line with one of the edges of the blade, the said edge also forming a tangent to the circular end of the said blade, substantially as described.

4. A protractor having a blade provided with a circular end, and a circumscribing arc or circle arranged concentric with the circular end of the blade and having a graduation into degrees with its zero point in line with one of the edges of the blade and its point of one hundred and eighty degrees therefrom in line with the opposite edge of the blade, substantially as described.

SAML. DARLING.

Witnesses:
JOHN E. HALL,
A. J. SHAW.